US012750351B2

(12) United States Patent
Soh

(10) Patent No.: US 12,750,351 B2

(45) Date of Patent: Sep. 29, 2026

(54) UNIQUE MACHINE-USER ID-SSH KEY FINGERPRINT

(71) Applicant: Capital One Services, LLC, McLean, VA (US)

(72) Inventor: Michael Soh, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 355 days.

(21) Appl. No.: 18/202,084

(22) Filed: May 25, 2023

(65) Prior Publication Data

US 2024/0396881 A1 Nov. 28, 2024

(51) Int. Cl.
*H04L 9/40* (2022.01)

(52) U.S. Cl.
CPC .......... *H04L 63/062* (2013.01); *H04L 63/068* (2013.01); *H04L 63/0876* (2013.01)

(58) Field of Classification Search
None
See application file for complete search history.

(56) References Cited

U.S. PATENT DOCUMENTS 6,539,479 B1 * 3/2003 Wu ......................... H04L 63/08 709/200
6,687,375 B1 2/2004 Maty as, Jr. et al.
7,178,025 B2 * 2/2007 Scheidt ................. H04L 63/062 713/168
7,290,288 B2 * 10/2007 Gregg ..................... H04L 63/08 726/28
7,792,939 B2 * 9/2010 Miao .................. H04L 41/0213 709/230
7,814,538 B2 * 10/2010 Kuehnel ............... H04L 9/3263 726/19
(Continued)

FOREIGN PATENT DOCUMENTS

WO WO-2015042604 A1 * 3/2015 ........... H04L 63/062

OTHER PUBLICATIONS

Xu et al "A Lightweight Virtual Machine Image Deduplication Backup Approach in Cloud Environment," IEEE Computer Society, pp. 503-508 (Year: 2014).*
(Continued)

*Primary Examiner* — Luu T Pham
*Assistant Examiner* — James J Wilcox
(74) *Attorney, Agent, or Firm* — Sterne, Kessler, Goldstein & Fox P.L.L.C.

(57) ABSTRACT

A method, system and computer program product for generating and managing a unique secure shell (SSH) key fingerprint for each installation of an SSH key. An SSH key manager may receive metadata for a host machine comprising a machine ID and a plurality of secure shell (SSH) key objects, wherein an SSH key object represents an SSH key for accessing an account on the host machine associated with a user. The SSH key manager may then identify a hash for the SSH key and user ID associated with each SSH key object of the plurality of objects. The SSH key manager may then generate a unique fingerprint for each SSH key object by concatenating the machine ID, user ID and SSH key hash corresponding to the SSH key object. The unique fingerprints may then be stored in a database along with corresponding information from the metadata.

17 Claims, 4 Drawing Sheets

(56) References Cited

U.S. PATENT DOCUMENTS

| | | | | |
|---|---|---|---|---|
| 8,086,842 | B2 * | 12/2011 | Sidhu | H04L 9/3236 713/168 |
| 8,127,345 | B2 * | 2/2012 | Gregg | H04L 63/08 726/4 |
| 8,261,062 | B2 * | 9/2012 | Aura | H04L 9/3263 713/162 |
| 8,473,749 | B1 * | 6/2013 | Madsen | H04W 12/35 726/28 |
| 8,607,067 | B1 * | 12/2013 | Janse van Rensburg | H04L 63/20 713/189 |
| 8,856,869 | B1 * | 10/2014 | Brinskelle | H04L 63/0823 726/2 |
| 8,949,954 | B2 * | 2/2015 | Etchegoyen | G06Q 50/265 713/182 |
| 8,953,786 | B2 | 2/2015 | Ramaswamy et al. | |
| 9,185,136 | B2 * | 11/2015 | Dulkin | G06F 21/577 |
| 9,215,075 | B1 * | 12/2015 | Poltorak | H04W 12/033 |
| 9,338,181 | B1 * | 5/2016 | Burns | H04L 63/1433 |
| 9,398,043 | B1 * | 7/2016 | Yang | H04L 63/1441 |
| 9,454,526 | B1 * | 9/2016 | Kapoor | G06F 21/32 |
| 9,521,147 | B2 * | 12/2016 | Barton | H04L 63/10 |
| 9,608,810 | B1 * | 3/2017 | Ghetti | H04L 63/0428 |
| 9,660,998 | B1 * | 5/2017 | Sethi | H04L 63/08 |
| 9,781,081 | B1 * | 10/2017 | Wasiq | H04L 63/166 |
| 10,003,458 | B2 | 6/2018 | Ylonen | |
| 10,033,711 | B2 * | 7/2018 | Yamamoto | H04L 63/0853 |
| 10,063,590 | B1 * | 8/2018 | Sharifi Mehr | H04L 63/205 |
| 10,079,683 | B1 * | 9/2018 | Chebaro | H04L 63/06 |
| 10,270,692 | B1 * | 4/2019 | Panda | H04L 67/146 |
| 10,425,292 | B1 * | 9/2019 | Biran | H04L 63/062 |
| 10,432,406 | B1 * | 10/2019 | Amdahl | H04L 63/205 |
| 10,447,668 | B1 * | 10/2019 | Norum | H04L 9/0822 |
| 10,462,116 | B1 * | 10/2019 | Sharifi Mehr | H04L 63/062 |
| 10,462,148 | B2 * | 10/2019 | Saxena | H04L 63/06 |
| 10,476,906 | B1 * | 11/2019 | Siddiqui | H04L 63/145 |
| 10,511,573 | B2 * | 12/2019 | Larson | H04L 63/10 |
| 10,554,507 | B1 * | 2/2020 | Siddiqui | G06F 21/562 |
| 10,560,440 | B2 * | 2/2020 | White | H04L 63/062 |
| 10,581,847 | B1 * | 3/2020 | Sun | H04L 63/083 |
| 10,581,865 | B1 * | 3/2020 | Irwan | H04L 63/0428 |
| 10,601,863 | B1 * | 3/2020 | Siddiqui | H04L 63/145 |
| 10,607,027 | B1 * | 3/2020 | Ben Naim | G06F 21/64 |
| 10,630,702 | B1 * | 4/2020 | Irwan | H04L 9/3239 |
| 10,708,256 | B1 * | 7/2020 | Kane-Parry | H04L 63/0823 |
| 10,719,373 | B1 * | 7/2020 | Koponen | G06F 21/64 |
| 10,735,430 | B1 * | 8/2020 | Stoler | H04L 9/14 |
| 10,749,867 | B1 * | 8/2020 | Litani | H04L 63/0876 |
| 10,764,752 | B1 * | 9/2020 | Avetisov | H04L 63/0823 |
| 10,771,261 | B1 * | 9/2020 | Lazar | H04L 9/3268 |
| 10,791,138 | B1 * | 9/2020 | Siddiqui | H04L 67/52 |
| 10,862,907 | B1 * | 12/2020 | Pon | G06F 16/955 |
| 10,885,217 | B1 * | 1/2021 | Rivlin | G06F 9/22 |
| 10,924,275 | B1 * | 2/2021 | Kumar | H04L 9/14 |
| 10,938,641 | B1 * | 3/2021 | Fritz | H04L 63/04 |
| 10,963,593 | B1 * | 3/2021 | Campagna | H04L 9/0861 |
| 10,979,422 | B1 * | 4/2021 | Fenichel | H04W 12/61 |
| 11,012,450 | B2 * | 5/2021 | Zhong | G06F 21/31 |
| 11,023,301 | B1 * | 6/2021 | Hornbeck | G06F 8/63 |
| 11,055,417 | B2 * | 7/2021 | Bhatia | G06F 21/577 |
| 11,089,013 | B2 * | 8/2021 | Childress | H04L 63/0876 |
| 11,095,448 | B2 | 8/2021 | Reardon et al. | |
| 11,095,612 | B1 * | 8/2021 | Oswal | H04L 63/1416 |
| 11,102,243 | B1 * | 8/2021 | Plenderleith | H04L 61/4511 |
| 11,115,799 | B1 * | 9/2021 | Du | H04L 63/1416 |
| 11,121,869 | B1 * | 9/2021 | Crahen | H04L 9/3242 |
| 11,121,878 | B2 * | 9/2021 | McCarty | H04L 9/3213 |
| 11,164,156 | B1 * | 11/2021 | Newman | H04L 51/212 |
| 11,178,188 | B1 * | 11/2021 | Wu | H04L 63/20 |
| 11,184,403 | B1 * | 11/2021 | Wu | H04L 67/10 |
| 11,218,326 | B1 * | 1/2022 | Eland | H04L 63/123 |
| 11,265,296 | B1 * | 3/2022 | Uysal | H04L 63/0272 |
| 11,271,972 | B1 * | 3/2022 | Ravi | H04L 63/0236 |
| 11,271,973 | B1 * | 3/2022 | Ravi | H04L 41/22 |
| 11,290,432 | B2 * | 3/2022 | Tav | G06F 21/6245 |
| 11,303,633 | B1 * | 4/2022 | Williams | H04L 63/083 |
| 11,303,647 | B1 * | 4/2022 | Wu | H04L 63/08 |
| 11,316,885 | B1 * | 4/2022 | Miseiko | H04L 63/20 |
| 11,323,477 | B1 * | 5/2022 | Kumar | H04L 63/168 |
| 11,329,827 | B2 * | 5/2022 | Sauerwald | H04L 9/3234 |
| 11,336,698 | B1 * | 5/2022 | Wu | G06F 21/54 |
| 11,425,134 | B1 * | 8/2022 | Patimer | H04L 67/562 |
| 11,436,310 | B1 * | 9/2022 | Tenaglia | H04L 63/1416 |
| 11,552,805 | B2 * | 1/2023 | Kumar | H04L 67/12 |
| 11,552,948 | B1 * | 1/2023 | Peterson | H04L 63/0876 |
| 11,552,975 | B1 * | 1/2023 | Zhang | H04W 4/70 |
| 11,677,547 | B1 * | 6/2023 | McDonald | H04L 9/3247 713/171 |
| 11,777,992 | B1 * | 10/2023 | Cross | H04L 63/0876 726/5 |
| 11,799,874 | B1 * | 10/2023 | Lichtenstein | H04L 63/14 |
| 11,800,351 | B2 * | 10/2023 | Fekih Ahmed | H04W 12/043 |
| 11,818,156 | B1 * | 11/2023 | Parikh | G06F 16/9537 |
| 11,870,768 | B1 * | 1/2024 | Vishwakarma | H04W 8/26 |
| 12,015,721 | B1 * | 6/2024 | Kumar | H04L 9/3263 |
| 12,095,796 | B1 * | 9/2024 | Godefroid | G06F 9/542 |
| 12,149,543 | B1 * | 11/2024 | Melnick | H04L 63/20 |
| 12,301,608 | B1 * | 5/2025 | Melnick | H04W 8/18 |
| 12,309,182 | B1 * | 5/2025 | McAleer | G06F 9/455 |
| 12,309,188 | B1 * | 5/2025 | Al Ghazo | H04L 63/1425 |
| 12,355,626 | B1 * | 7/2025 | Varakantam | H04L 67/535 |
| 12,463,959 | B2 * | 11/2025 | Gaffney | H04L 63/20 |
| 12,495,052 | B1 * | 12/2025 | Godefroid | H04L 63/1425 |
| 2002/0023220 | A1 * | 2/2002 | Kaplan | H04L 9/3247 713/176 |
| 2002/0124064 | A1 * | 9/2002 | Epstein | H04L 63/083 717/171 |
| 2002/0143944 | A1 * | 10/2002 | Traversat | H04L 67/1059 709/225 |
| 2003/0195861 | A1 * | 10/2003 | McClure | H04L 41/12 |
| 2003/0217039 | A1 * | 11/2003 | Kurtz | H04L 63/1433 |
| 2004/0015728 | A1 * | 1/2004 | Cole | G02B 6/12011 709/224 |
| 2004/0078384 | A1 * | 4/2004 | Keir | H04L 63/0218 707/999.102 |
| 2004/0088348 | A1 * | 5/2004 | Yeager | H04L 67/104 709/202 |
| 2004/0133640 | A1 * | 7/2004 | Yeager | H04L 67/104 709/204 |
| 2004/0133775 | A1 * | 7/2004 | Callas | H04L 63/0442 713/153 |
| 2005/0086300 | A1 * | 4/2005 | Yeager | H04L 69/329 709/204 |
| 2006/0173985 | A1 * | 8/2006 | Moore | H04L 67/00 707/E17.116 |
| 2006/0174323 | A1 * | 8/2006 | Brown | H04L 63/0428 726/3 |
| 2006/0212932 | A1 * | 9/2006 | Patrick | H04L 63/1441 726/13 |
| 2007/0011319 | A1 * | 1/2007 | McClure | H04L 63/145 709/224 |
| 2007/0050777 | A1 * | 3/2007 | Hutchinson | G06F 11/0781 718/104 |
| 2007/0118740 | A1 * | 5/2007 | Deishi | H04L 63/0823 713/158 |
| 2007/0192863 | A1 * | 8/2007 | Kapoor | G06F 9/505 726/23 |
| 2008/0165789 | A1 * | 7/2008 | Ansari | G05B 19/042 370/401 |
| 2008/0168523 | A1 * | 7/2008 | Ansari | H04L 47/83 725/105 |
| 2008/0229415 | A1 * | 9/2008 | Kapoor | H04L 63/14 726/22 |
| 2008/0262990 | A1 * | 10/2008 | Kapoor | H04L 63/145 706/20 |
| 2008/0262991 | A1 * | 10/2008 | Kapoor | H04L 63/14 706/20 |
| 2009/0055924 | A1 * | 2/2009 | Trotter | H04L 63/0853 726/20 |
| 2009/0064300 | A1 * | 3/2009 | Bagepalli | H04L 47/20 726/7 |

(56) References Cited

U.S. PATENT DOCUMENTS

2009/0097661 A1* 4/2009 Orsini .................... G06F 21/45 380/279
2009/0158430 A1* 6/2009 Borders ................ G06F 21/552 726/23
2010/0042846 A1* 2/2010 Trotter .................. H04L 63/104 235/375
2010/0142410 A1* 6/2010 Huynh Van ......... H04L 12/4633 370/255
2010/0198705 A1* 8/2010 Spalink ................. H04L 63/126 709/224
2011/0093913 A1* 4/2011 Wohlert .............. H04L 63/0861 726/1
2011/0213869 A1* 9/2011 Korsunsky ............. G06F 21/55 709/223
2011/0214157 A1* 9/2011 Korsunsky .......... H04L 63/1458 726/1
2011/0219035 A1* 9/2011 Korsunsky ............. G06F 21/00 707/E17.005
2011/0225417 A1* 9/2011 Maharajh .............. H04L 65/752 713/150
2011/0231510 A1* 9/2011 Korsunsky ............. G06F 21/55 709/213
2011/0231564 A1* 9/2011 Korsunsky .......... H04L 63/1483 709/231
2011/0238855 A1* 9/2011 Korsunsky .......... H04L 63/1441 709/231
2011/0320808 A1* 12/2011 Swingler ................ H04L 63/12 713/170
2012/0084262 A1* 4/2012 Dwarampudi .......... G06F 9/445 711/E12.001
2012/0084838 A1* 4/2012 Inforzato ................ H04L 63/10 726/4
2012/0089481 A1* 4/2012 Lozzia .................... H04N 7/16 726/5
2012/0117458 A1* 5/2012 Holloway ............... G06F 16/95 715/234
2012/0204032 A1* 8/2012 Wilkins .............. H04L 63/0428 713/170
2012/0210427 A1* 8/2012 Bronner .................. H04L 63/30 726/23
2012/0240185 A1* 9/2012 Kapoor ............... H04L 41/0866 726/1
2012/0317622 A1* 12/2012 Harjanto ................. G06F 21/44 726/4
2013/0111596 A1* 5/2013 Rayes ................. H04L 41/0213 726/26
2013/0117554 A1* 5/2013 Ylonen ................. H04L 9/0891 713/151
2013/0174228 A1* 7/2013 Etchegoyen .......... H04W 12/08 726/4
2014/0007214 A1* 1/2014 Qureshi .................. G06F 21/14 726/3
2014/0075525 A1* 3/2014 Ferlin ................. H04L 63/0838 726/6
2014/0143543 A1* 5/2014 Aikas .................. H04L 67/1097 713/168
2014/0164768 A1* 6/2014 Kruglick ............... H04L 63/062 713/168
2014/0215574 A1* 7/2014 Erb ........................ H04L 63/10 726/4
2014/0282887 A1* 9/2014 Kaminsky ........... H04L 63/1466 726/4
2014/0325611 A1* 10/2014 Iverson ................. H04L 63/083 726/4
2014/0325620 A1* 10/2014 Samson ................ H04L 63/083 718/100
2014/0359749 A1* 12/2014 Rieke .................. H04L 63/1433 726/11
2015/0013000 A1* 1/2015 Linnakangas ......... H04L 63/168 726/14
2015/0067819 A1* 3/2015 Shribman ............... H04L 67/06 709/218
2015/0082032 A1* 3/2015 Bruce ..................... H04L 63/08 713/168
2015/0222604 A1* 8/2015 Ylonen ..................... H04L 9/14 713/171
2015/0278444 A1* 10/2015 Westin ................... G16H 30/20 382/128
2016/0072800 A1* 3/2016 Soon-Shiong ........ H04L 9/0872 726/7
2016/0072815 A1* 3/2016 Rieke .................... H04L 63/101 726/3
2016/0072831 A1* 3/2016 Rieke .................. H04L 63/1433 726/1
2016/0087933 A1* 3/2016 Johnson ................ H04W 12/35 709/245
2016/0134639 A1* 5/2016 Kaminsky ............. H04L 63/126 726/3
2016/0205002 A1* 7/2016 Rieke ...................... H04L 43/04 709/224
2016/0219024 A1* 7/2016 Verzun ...................... H04L 9/34
2016/0234215 A1* 8/2016 Shankar .................. H04L 63/10
2016/0269377 A1* 9/2016 Ylönen ................. H04L 9/0891
2016/0330233 A1* 11/2016 Hart ........................ H04L 63/20
2016/0344544 A1* 11/2016 Biesinger ................ H04L 63/20
2017/0041333 A1* 2/2017 Mahjoub ............. H04L 43/0876
2017/0063912 A1* 3/2017 Muddu .................. G06N 20/20
2017/0085558 A1* 3/2017 Ibrahim .............. H04L 63/0838
2017/0093978 A1* 3/2017 Cilfone ................. G06F 3/0659
2017/0103388 A1* 4/2017 Pillai .................. G06Q 20/3823
2017/0111368 A1* 4/2017 Hibbert ................. H04L 63/102
2017/0149741 A1* 5/2017 Hallett ................ H04L 63/0421
2017/0169227 A1* 6/2017 Rajcan ................ H04L 63/0428
2017/0195439 A1* 7/2017 Dixon ..................... G06F 21/56
2017/0264600 A1* 9/2017 Froelicher ........... H04L 63/0823
2017/0272316 A1* 9/2017 Johnson .............. H04W 12/068
2017/0324758 A1* 11/2017 Hart .................... H04L 63/0428
2017/0346851 A1* 11/2017 Drake ................... H04L 9/0838
2017/0364702 A1* 12/2017 Goldfarb ................. H04L 63/20
2017/0364713 A1* 12/2017 Speak ..................... G06F 21/53
2017/0366581 A1* 12/2017 Ylonen ............... H04L 63/0428
2018/0054490 A1* 2/2018 Wadhwa .............. G08G 1/0129
2018/0069865 A1* 3/2018 Rieke .................... H04L 43/045
2018/0091557 A1* 3/2018 Komu ..................... H04L 63/08
2018/0109538 A1* 4/2018 Kumar .................... H04L 63/08
2018/0191725 A1* 7/2018 Luukkala .............. H04L 63/166
2018/0191726 A1* 7/2018 Luukkala ............ H04L 63/1466
2018/0205743 A1* 7/2018 McIver ...................... H04L 9/30
2018/0262388 A1* 9/2018 Johnson .................. H04W 4/70
2018/0288077 A1* 10/2018 Siddiqui ............. H04L 63/1416
2018/0288082 A1* 10/2018 Pope ................... H04L 63/1425
2018/0288198 A1* 10/2018 Pope ....................... H04L 41/16
2018/0367528 A1* 12/2018 Schwarz ............. H04L 63/0807
2019/0028514 A1* 1/2019 Barboi .................... H04L 63/20
2019/0036766 A1* 1/2019 Popov ..................... H04L 67/10
2019/0109713 A1* 4/2019 Clark .................... G06F 16/182
2019/0109820 A1* 4/2019 Clark .................... H04L 9/0861
2019/0116153 A1* 4/2019 Deverakonda Venkata ................ H04L 9/3268
2019/0121961 A1* 4/2019 Coleman ............. H04L 63/0227
2019/0129706 A1* 5/2019 Vangeel ..................... G06F 8/63
2019/0132316 A1* 5/2019 Gramza .............. H04L 63/0876
2019/0132931 A1* 5/2019 Sharma .................. H05B 47/20
2019/0140849 A1* 5/2019 Kravitz ................. H04L 9/3236
2019/0158353 A1* 5/2019 Johnson .............. H04L 63/0823
2019/0163510 A1* 5/2019 Govardhan ............. H04L 67/14
2019/0182242 A1* 6/2019 Aizikovich ......... H04L 63/0823
2019/0182294 A1* 6/2019 Rieke .................. H04L 63/1433
2019/0207937 A1* 7/2019 Neilan .................. H04L 63/083
2019/0207948 A1* 7/2019 Mallis ..................... H04L 63/20
2019/0238467 A1* 8/2019 Guan ...................... H04L 63/20
2019/0238506 A1* 8/2019 Shaw .................... H04L 63/102
2019/0238538 A1* 8/2019 Shaw .................. H04L 63/0227
2019/0238591 A1* 8/2019 Shaw .................. H04L 63/0876
2019/0253254 A1* 8/2019 Brownlee .......... G06K 19/0725
2019/0253523 A1* 8/2019 Raduchel ............... G06Q 50/01
2019/0260724 A1* 8/2019 Hefetz .................. H04L 63/107
2019/0260751 A1* 8/2019 Kale ....................... H04L 63/10
2019/0260782 A1* 8/2019 Humphrey .......... H04L 63/1441
2019/0268317 A1* 8/2019 Haelion .............. H04L 63/0435

(56) References Cited

U.S. PATENT DOCUMENTS

| | | | | |
|---|---|---|---|---|
| 2019/0273723 | A1* | 9/2019 | VanBlon | H04L 63/0876 |
| 2019/0288913 | A1* | 9/2019 | Salgueiro | H04W 4/50 |
| 2019/0289013 | A1* | 9/2019 | Makmel | H04L 63/0876 |
| 2019/0297065 | A1* | 9/2019 | Kanungo | H04L 9/0891 |
| 2019/0297097 | A1* | 9/2019 | Gong | G06F 21/564 |
| 2019/0306130 | A1* | 10/2019 | Kaplan Haelion | H04L 63/20 |
| 2019/0306731 | A1* | 10/2019 | Raghuramu | H04L 63/1433 |
| 2019/0312839 | A1* | 10/2019 | Grimm | H04L 63/20 |
| 2019/0319931 | A1* | 10/2019 | Men | G06F 9/45533 |
| 2019/0332297 | A1* | 10/2019 | Zhang | G06F 21/6218 |
| 2019/0332774 | A1* | 10/2019 | Nix | H04L 9/006 |
| 2019/0342170 | A1* | 11/2019 | Pathak | H04L 67/34 |
| 2019/0356482 | A1* | 11/2019 | Nix | H04W 12/041 |
| 2019/0379701 | A1* | 12/2019 | Sathyanarayanamurthy | H04L 63/108 |
| 2019/0384956 | A1* | 12/2019 | Whelan, III | G06F 21/32 |
| 2019/0386970 | A1* | 12/2019 | Signorini | H04L 9/3218 |
| 2019/0394200 | A1* | 12/2019 | Godier | H04L 9/0866 |
| 2020/0004946 | A1* | 1/2020 | Gilpin | H04L 9/50 |
| 2020/0014527 | A1* | 1/2020 | Subramaniam | G06F 21/10 |
| 2020/0026732 | A1* | 1/2020 | Bequet | G06F 16/164 |
| 2020/0044847 | A1* | 2/2020 | Li | H04L 9/0825 |
| 2020/0052911 | A1* | 2/2020 | Popoveniuc | H04L 9/3268 |
| 2020/0053079 | A1* | 2/2020 | Bendersky | H04L 9/14 |
| 2020/0053096 | A1* | 2/2020 | Bendersky | G06F 21/32 |
| 2020/0059469 | A1* | 2/2020 | Chellappa | H04L 9/085 |
| 2020/0065502 | A1* | 2/2020 | Lockman | G06F 9/4806 |
| 2020/0067777 | A1* | 2/2020 | Tandel | H04L 67/303 |
| 2020/0067907 | A1* | 2/2020 | Avetisov | H04L 67/133 |
| 2020/0067922 | A1* | 2/2020 | Avetisov | H04L 63/0823 |
| 2020/0076842 | A1* | 3/2020 | Zhou | G06N 3/084 |
| 2020/0099527 | A1* | 3/2020 | Reardon | H04L 9/3236 |
| 2020/0117472 | A1* | 4/2020 | Willoughby | G06F 9/4408 |
| 2020/0133700 | A1* | 4/2020 | Savir | G06F 9/5077 |
| 2020/0145216 | A1* | 5/2020 | Clark | G06Q 20/36 |
| 2020/0145459 | A1* | 5/2020 | Feutz | H04L 63/062 |
| 2020/0153627 | A1* | 5/2020 | Wentz | H04L 9/50 |
| 2020/0162543 | A1* | 5/2020 | Mosko | H04L 67/104 |
| 2020/0177667 | A1* | 6/2020 | Nagao | H04L 67/025 |
| 2020/0186856 | A1* | 6/2020 | Yang | H04N 21/4408 |
| 2020/0195446 | A1* | 6/2020 | Lepoint | H04L 63/0435 |
| 2020/0259896 | A1* | 8/2020 | Sachs | H04L 63/0428 |
| 2020/0280568 | A1* | 9/2020 | Bratspiess | H04L 63/1433 |
| 2020/0285652 | A1* | 9/2020 | Wang | H04L 67/10 |
| 2020/0295997 | A1* | 9/2020 | Kotalwar | H04L 63/0876 |
| 2020/0296139 | A1* | 9/2020 | Fainberg | H04L 63/105 |
| 2020/0304318 | A1* | 9/2020 | Kravitz | H04L 9/3268 |
| 2020/0304492 | A1* | 9/2020 | Nordstrom | G06F 21/31 |
| 2020/0304508 | A1* | 9/2020 | Bae | H04L 63/0876 |
| 2020/0320199 | A1* | 10/2020 | Sheth | H04L 63/123 |
| 2020/0336486 | A1* | 10/2020 | Orsini | H04L 63/0876 |
| 2020/0344084 | A1* | 10/2020 | Shribman | H04L 67/02 |
| 2020/0374129 | A1* | 11/2020 | Dilles | H04L 9/3273 |
| 2020/0380475 | A1* | 12/2020 | Krueger | G06F 16/27 |
| 2020/0380506 | A1* | 12/2020 | Chang | H04L 63/0876 |
| 2020/0382499 | A1* | 12/2020 | Sosiade | H04L 9/3239 |
| 2020/0396211 | A1* | 12/2020 | Dobbins | H04L 63/08 |
| 2020/0403994 | A1* | 12/2020 | Bitterfeld | H04L 63/0884 |
| 2020/0404007 | A1* | 12/2020 | Singh | G06F 16/24537 |
| 2020/0412540 | A1* | 12/2020 | Sabath | H04L 9/0866 |
| 2021/0021637 | A1* | 1/2021 | Srivastava | H04L 63/0876 |
| 2021/0029100 | A1* | 1/2021 | Bendersky | H04L 63/0876 |
| 2021/0037055 | A1* | 2/2021 | Dumont | H04L 9/3239 |
| 2021/0044976 | A1* | 2/2021 | Avetisov | H04W 12/08 |
| 2021/0051137 | A1* | 2/2021 | Ruiz | H04L 9/0894 |
| 2021/0051218 | A1* | 2/2021 | Minaburo | H04L 61/4511 |
| 2021/0058412 | A1* | 2/2021 | Rowland | H04L 63/1416 |
| 2021/0064765 | A1* | 3/2021 | Lapworth | H04L 67/10 |
| 2021/0067505 | A1* | 3/2021 | Gandhi | H04L 41/5067 |
| 2021/0067547 | A1* | 3/2021 | Hale | H04L 63/102 |
| 2021/0084010 | A1* | 3/2021 | Alharbi | H04L 63/104 |
| 2021/0091941 | A1* | 3/2021 | Pancras | H04L 9/0863 |
| 2021/0112650 | A1* | 4/2021 | Rupp | H04L 67/34 |
| 2021/0136063 | A1* | 5/2021 | Cheek | H04W 12/12 |
| 2021/0144015 | A1* | 5/2021 | Rossi | H04L 9/3263 |
| 2021/0144139 | A1* | 5/2021 | Bouvet | H04L 63/101 |
| 2021/0152532 | A1* | 5/2021 | Reinhold | H04L 9/0643 |
| 2021/0157934 | A1* | 5/2021 | Leal Monteiro | G06F 21/32 |
| 2021/0160241 | A1* | 5/2021 | Andreev | H04L 63/062 |
| 2021/0168167 | A1* | 6/2021 | Kirti | H04L 63/20 |
| 2021/0194913 | A1* | 6/2021 | Hecht | H04L 63/105 |
| 2021/0203682 | A1* | 7/2021 | Bajpai | H04L 63/1441 |
| 2021/0211283 | A1* | 7/2021 | Wang | H04L 9/0819 |
| 2021/0218571 | A1* | 7/2021 | Ansari | H04M 15/705 |
| 2021/0218737 | A1* | 7/2021 | Bhagvath | H04W 12/0433 |
| 2021/0250333 | A1* | 8/2021 | Negrea | H04L 9/14 |
| 2021/0258308 | A1* | 8/2021 | Avetisov | H04L 9/0825 |
| 2021/0273949 | A1* | 9/2021 | Howlett | G06N 3/0895 |
| 2021/0281547 | A1* | 9/2021 | Seitz | H04L 63/083 |
| 2021/0306213 | A1* | 9/2021 | Medvinsky | H04L 9/0827 |
| 2021/0306309 | A1* | 9/2021 | Negahdar | H04L 67/34 |
| 2021/0306341 | A1* | 9/2021 | Tiwari | H04L 63/0236 |
| 2021/0326460 | A1* | 10/2021 | Zhang | G06F 16/2379 |
| 2021/0326461 | A1* | 10/2021 | Paul | H04L 63/1425 |
| 2021/0329004 | A1* | 10/2021 | Xing | H04L 41/0213 |
| 2021/0329010 | A1* | 10/2021 | Paul | G06F 21/6245 |
| 2021/0344719 | A1* | 11/2021 | Ober | G06F 8/61 |
| 2021/0352064 | A1* | 11/2021 | Tsarfati | H04L 63/1416 |
| 2021/0365445 | A1* | 11/2021 | Robell | G06F 16/90 |
| 2021/0377215 | A1* | 12/2021 | Wang | H04L 63/20 |
| 2022/0006772 | A1* | 1/2022 | Eland | H04L 9/0891 |
| 2022/0021671 | A1* | 1/2022 | Banerjee | H04L 63/0876 |
| 2022/0021678 | A1* | 1/2022 | Kreger-Stickles | H04L 12/4641 |
| 2022/0029794 | A1* | 1/2022 | Malhotra | H04L 9/3242 |
| 2022/0050933 | A1* | 2/2022 | Desanti | G06F 21/31 |
| 2022/0060474 | A1* | 2/2022 | Trentini | H04L 63/0236 |
| 2022/0070666 | A1* | 3/2022 | Hua | H04L 9/3271 |
| 2022/0078171 | A1* | 3/2022 | Borak | H04L 63/0236 |
| 2022/0078176 | A1* | 3/2022 | Adda | H04L 63/0853 |
| 2022/0095092 | A1* | 3/2022 | Siddam | H04L 63/102 |
| 2022/0103549 | A1* | 3/2022 | Jefferies | H04L 41/0886 |
| 2022/0103550 | A1* | 3/2022 | Wang | H04L 63/0876 |
| 2022/0116384 | A1* | 4/2022 | Bartsch | H04L 63/20 |
| 2022/0141027 | A1* | 5/2022 | Gaal | H04L 63/1483 713/168 |
| 2022/0150220 | A1* | 5/2022 | Verheyen | H04L 9/50 |
| 2022/0164453 | A1* | 5/2022 | Kammachi Sreedhar | H04L 9/088 |
| 2022/0174096 | A1* | 6/2022 | Schmitt | H04L 67/1097 |
| 2022/0188087 | A1* | 6/2022 | Montag | G06F 8/60 |
| 2022/0200869 | A1* | 6/2022 | Erlingsson | H04L 67/10 |
| 2022/0200976 | A1* | 6/2022 | Lam | H04L 63/164 |
| 2022/0200988 | A1* | 6/2022 | Garg | H04L 63/168 |
| 2022/0208319 | A1* | 6/2022 | Ansari | H04L 12/2829 |
| 2022/0210063 | A1* | 6/2022 | Brar | G06F 9/45558 |
| 2022/0217139 | A1* | 7/2022 | Pieczul | H04L 63/101 |
| 2022/0217520 | A1* | 7/2022 | Akiyama | G06F 21/44 |
| 2022/0224716 | A1* | 7/2022 | Salji | H04L 63/1441 |
| 2022/0245264 | A1* | 8/2022 | Tang | H04W 12/069 |
| 2022/0247769 | A1* | 8/2022 | Erlingsson | G06F 9/5072 |
| 2022/0247776 | A1* | 8/2022 | Hecht | H04L 63/1433 |
| 2022/0253430 | A1* | 8/2022 | Paul | G06F 16/2255 |
| 2022/0254206 | A1* | 8/2022 | Dykstra | G07C 9/27 |
| 2022/0255929 | A1* | 8/2022 | Rafferty | H04L 63/107 |
| 2022/0255931 | A1* | 8/2022 | Avetisov | H04L 9/3247 |
| 2022/0255932 | A1* | 8/2022 | Chan | H04W 12/72 |
| 2022/0255933 | A1* | 8/2022 | Chan | H04W 12/35 |
| 2022/0272117 | A1* | 8/2022 | Maheve | H04L 63/1416 |
| 2022/0286459 | A1* | 9/2022 | Dohare | H04L 63/107 |
| 2022/0294789 | A1* | 9/2022 | Tikhomirov | H04L 12/2816 |
| 2022/0294854 | A1* | 9/2022 | Tikhomirov | H04L 67/34 |
| 2022/0303273 | A1* | 9/2022 | Jaakkola | H04L 41/12 |
| 2022/0311757 | A1* | 9/2022 | Balasubramanian | H04L 63/0209 |
| 2022/0311761 | A1* | 9/2022 | Choi | H04L 63/0884 |
| 2022/0311794 | A1* | 9/2022 | Maya | G06F 11/0766 |
| 2022/0321532 | A1* | 10/2022 | Du | H04L 43/062 |
| 2022/0329616 | A1* | 10/2022 | O'Hearn | G06F 9/545 |
| 2022/0337557 | A1* | 10/2022 | Head | H04L 63/0245 |
| 2022/0345482 | A1* | 10/2022 | Shua | G06F 21/568 |
| 2022/0345490 | A1* | 10/2022 | Wu | H04L 67/10 |
| 2022/0353153 | A1* | 11/2022 | Costante | H04L 63/1433 |
| 2022/0353244 | A1* | 11/2022 | Kahn | H04L 67/12 |

(56) References Cited

U.S. PATENT DOCUMENTS

2022/0353267 A1* 11/2022 Kundu .................. H04L 63/102
2022/0382637 A1* 12/2022 Balasubramanian ........................ H04L 67/1097
2022/0407840 A1* 12/2022 Chen ................... H04L 63/0236
2022/0413903 A1* 12/2022 Kalley .................. G06F 9/5072
2022/0417038 A1* 12/2022 Kravitz ................... H04L 63/10
2022/0417215 A1* 12/2022 Parthasarathi ........ H04L 63/029
2023/0028528 A1* 1/2023 Mousseau ........... G06F 21/6281
2023/0028642 A1* 1/2023 Li ......................... H04L 63/168
2023/0029788 A1* 2/2023 Chen ................... H04L 63/0823
2023/0063515 A1* 3/2023 Rahn ................... H04L 63/0876
2023/0073309 A1* 3/2023 D'souza ................ H04L 9/0822
2023/0095870 A1* 3/2023 Du ...................... H04L 63/1416 726/23
2023/0098641 A1* 3/2023 Sharma ............... H04L 63/0815 726/8
2023/0101920 A1* 3/2023 Xiao ................... H04L 63/0884 713/168
2023/0114232 A1* 4/2023 Purusothaman ...... H04L 63/062 709/223
2023/0119385 A1* 4/2023 Fenichel ............. H04L 63/0876 726/6
2023/0123781 A1* 4/2023 Kaimal ................. H04L 67/141 726/12
2023/0132934 A1* 5/2023 Wilson ................ H04L 63/0807 726/6
2023/0144341 A1* 5/2023 Payne ................. H04L 63/0272 713/2
2023/0171095 A1* 6/2023 Duhan .................. H04L 9/0869 713/168
2023/0171267 A1* 6/2023 Lancioni ............... G06F 21/564 726/26
2023/0188540 A1* 6/2023 Valluri ................ H04L 63/0876 726/22
2023/0208838 A1* 6/2023 Kao .................... H04L 63/0823 726/4
2023/0222204 A1* 7/2023 Vogel ...................... G06F 21/45 726/6
2023/0231860 A1* 7/2023 Tian .................... H04L 63/1416 726/1
2023/0246818 A1* 8/2023 Peddada ............... H04L 9/0825 713/171
2023/0262093 A1* 8/2023 Gupta ................. H04L 63/1425 726/1
2023/0269149 A1* 8/2023 Huang .................. H04L 63/062 709/224
2023/0283465 A1* 9/2023 Bathula ................. H04L 9/0894 713/164
2023/0283637 A1* 9/2023 Kondapi ............... H04L 63/123 726/7
2023/0300114 A1* 9/2023 Bhallamudi ............ H04L 63/10 726/6
2023/0308458 A1* 9/2023 Varsanyi ............... H04L 63/166
2023/0336579 A1* 10/2023 Ellsworth ........... H04L 63/1433
2023/0370455 A1* 11/2023 Joshi ..................... H04L 63/123
2023/0421550 A1* 12/2023 Neate .................. H04L 63/0823
2024/0056482 A1* 2/2024 Ignatius .............. H04L 63/1433
2024/0111689 A1* 4/2024 Khaund ................ H04L 63/062
2024/0111897 A1* 4/2024 Schroeder ........... G06F 21/6254
2024/0129314 A1* 4/2024 Desanti ................. H04L 63/102
2024/0195829 A1* 6/2024 Pieczul ................. H04L 63/205
2024/0267248 A1* 8/2024 Huang ................ H04L 63/0876
2024/0323034 A1* 9/2024 Kumar .................. H04L 9/3268
2025/0023714 A1* 1/2025 Kumar ................... G06N 20/00
2025/0023734 A1* 1/2025 Haverinen .............. H04L 63/18
2025/0094519 A1* 3/2025 Kol ......................... H04L 67/59
2025/0258916 A1* 8/2025 Rowland ............. H04L 63/1416
2025/0323909 A1* 10/2025 Rowland ............... H04L 63/083

OTHER PUBLICATIONS

Patel et al "Decentralized Storage for Scientific Data," IEEE, pp. 3760-3769 (Year: 2021).*
Turnbull et al "Breakpoints: An Analysis of Potential Hypervisor Attack Vectors," IEEE, pp. 1-6 (Year: 2013).*
Ylonen "SSH Key Management Challenges and Requirements," IEEE, pp. 1-5 (Year: 2019).*
Neel et al Oh SSH-it, What's My Fingerprint? A Large-Scale Analysis of SSH Host Key Fingerprint Verification Records in the DNS, pp. 1-18 (Year: 2022).*
Ylonen et al "SSH Key Management Challenges and Requirements," IEEE, pp. 1-5 (Year: 2019).*
Gasser et al "A Deeper Understanding of SSH: Results from Internet-Wide Scans," IEEE, pp. 1-9 (Year: 2014).*

* cited by examiner

UNIQUE MACHINE-USER ID-SSH KEY FINGERPRINT

BACKGROUND

Complex computing networks require a system for managing access to various components of the network. For example, there may be a plurality of developers and/or systems administrators who need access to network components for various reasons, including, but not limited to, routine and/or emergency network or component maintenance. To provide access while maintaining a high level of security, secure shell (SSH) keys may be used to authenticate users of the network. However, the tracking of such keys may become robust and create network insecurities if not properly tracked. Therefore, a system for managing the creation, distribution, and rotation of SSH keys is needed to keep track of the proliferation of keys and thus ensure the network remains secure.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Provided herein are systems, apparatus, devices, methods, and/or computer program product embodiments, and/or combinations and sub-combinations thereof, for generating a unique SSH key fingerprint for an installation of an SSH key on a host machine by a user.

An organization may have a large computing infrastructure for developing, hosting, and maintaining one or more applications. Such an infrastructure may comprise a plurality of computing devices. These computing devices may include client devices such as desktop personal computers (PCs), tablet PCs, mobile devices, etc., as well as host machines, each hosting one or more applications. Host machines may include, without limitation, servers, mainframes, virtual machines executed on a cloud computing program, etc.

Embodiments herein shall be described with respect to generating and managing unique SSH fingerprints for SSH keys installed on host machines that are used to authenticate users and grant the users access to the host machines. However, a person of skill in the art will appreciate that a similar process may be used to generate unique fingerprints for SSH keys installed on any computing device within a computing network.

Figure 1:
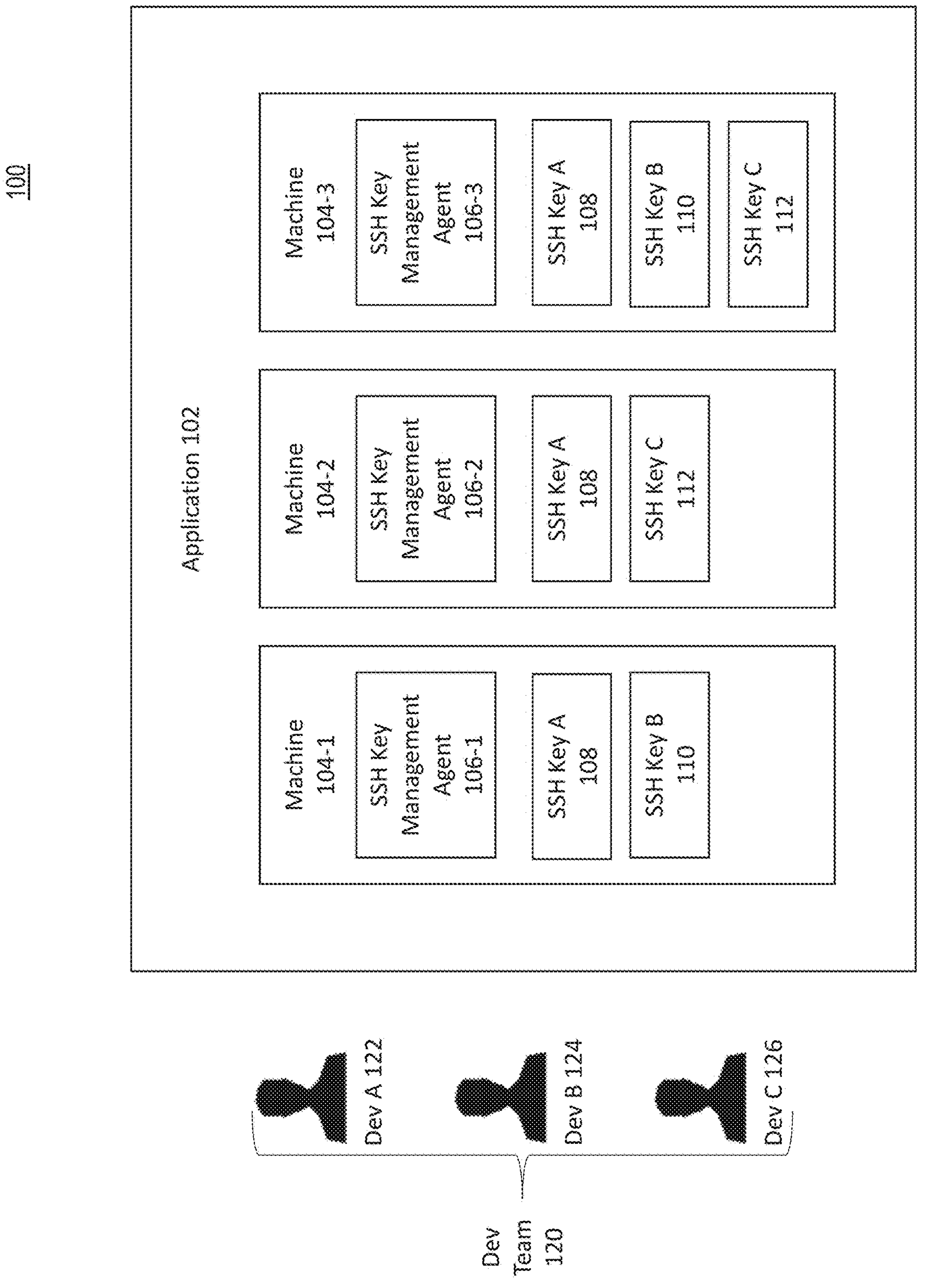
FIG. 1 illustrates a block diagram of a network for which generating and managing a unique SSH key fingerprint for each installation of an SSH key may be used in accordance with some embodiments.

FIG. 1 illustrates a block diagram of network 100 for which generating and managing a unique SSH key fingerprint for each installation of an SSH key may be used, according to some embodiments of the present disclosure. Network 100 may comprise one or more applications 102 hosted on one or more computing machines 104. FIG. 1 depicts one application 102 hosted on three computing machines, 104-1, 104-2, and 104-3. However, it is to be appreciated that application 102 may be hosted on a fewer or greater number of computing machines. Additionally, each computing machine may host two or more applications.

In some embodiments, SSH Key Management Agents (agents) 106-1, 106-2, and 106-3 may be software programs executing on computing machines 104-1, 104-2, and 104-3, respectively. Agents 106 may be configured to record and report operational metadata for computing machines 104. The recorded metadata may be reported to an SSH management system 202. The metadata may comprise, for example, a machine ID, the accounts associated with the machine, and the SSH keys installed on machines 104, etc. As used herein and in some embodiments, "machine ID" may refer to any identifier that is unique to the machine within network 100. For example, network 100 may be part of a cloud computing service (e.g., Amazon Web Services (AWS), Google Cloud, Microsoft Azure, etc.), and computing machines 104 may be virtual machine instances. Accordingly, the instant ID assigned to each computing machine in network 100 may be used as the unique identifier for the machine (i.e., machine ID).

Additionally, the metadata may also include specific information about each SSH key installed on machine 104, such as the unique hash associated with the SSH key, the status of the key, the user ID of the user who generated the key and/or installed it on machine 104, and the account on machine 104 for which the key is used to access.

In some embodiments, the status of the SSH key may indicate whether the key is valid for use. This status may be determined by agents 106 based on a variety of predetermined factors. In some embodiments, these factors may be configured based on security needs that are determined at a machine, application, network, and/or organization level. For example, an organization may determine that SSH keys used on all their machines must expire after 40 days, regardless of the network in which the machines are located or applications hosted by the machines. Additionally, or alternatively, the organization may require that an SSH key be registered in a central registration system by the user who generates the key and is approved by the registration system in order to be valid for use. The expiration time period and the implementation of the registration system may differ based on the needs of the organization.

In another example, it may be determined that the security needs of application 102 are greater than those of other applications hosted on machines in network 100. As such, the time period for which SSH keys used to access machines 104-1, 104-2, and 104-3 remain valid may be significantly shorter than the time period for SSH keys used to access other machines in network 100 (e.g., 30 days).

In some embodiments, the users that are able to generate, install, and use SSH keys to access computing machines 104 may include developer team 120. FIG. 1 depicts dev team 120 as comprising three developers, dev 122, dev 124, and dev 126. However, dev team 120 may include one or more developers whose roles include maintenance of machines that host application 102.

For example, dev 122 may generate SSH key 108 and use it to securely access all three machines 104 hosting application 102. Dev 122 may have generated SSH key 108 specifically for use with the admin account associated with each machine 104-1, 104-2, and 104-3. As such, SSH key 108 may be registered and approved for use with the admin accounts on machines 104. In some embodiments, dev 122 may share the private key corresponding to SSH key 108 with the other members of dev team 120 (dev 124 and dev 126). As a result, devs 124 and 126 may access the admin accounts associated with machines 104 using SSH key 108.

Additionally, devs 124 and 126 may each generate their own SSH keys, 110 and 112, respectively. In some embodiments, dev 124 may only need access to machines 104-1 and 104-3, while dev 126 may need access to machines 104-2 and 104-3. As such, dev 124 may only install SSH key 110 under non-admin accounts on machines 104-1 and 104-3. Similarly, dev 126 may install SSH key 112 under the non-accounts on machines 104-2 and 104-3.

When an SSH key is set to expire, the user who installed the SSH key on one or more computing machines 104 in network 100 may be responsible for replacing the SSH key on the one or more machines 104. However, a user may work on a large number of computing machines and thus may have generated and installed one or more keys on these machines. As such, the user may not remember every machine on which they installed a particular SSH key and under which accounts each key was installed. In such situations, there needs to be a way to identify not only the SSH keys used in network 100 but also the machines on which each key has been installed. Embodiments herein provide a solution, as will be discussed next.

Figure 2:
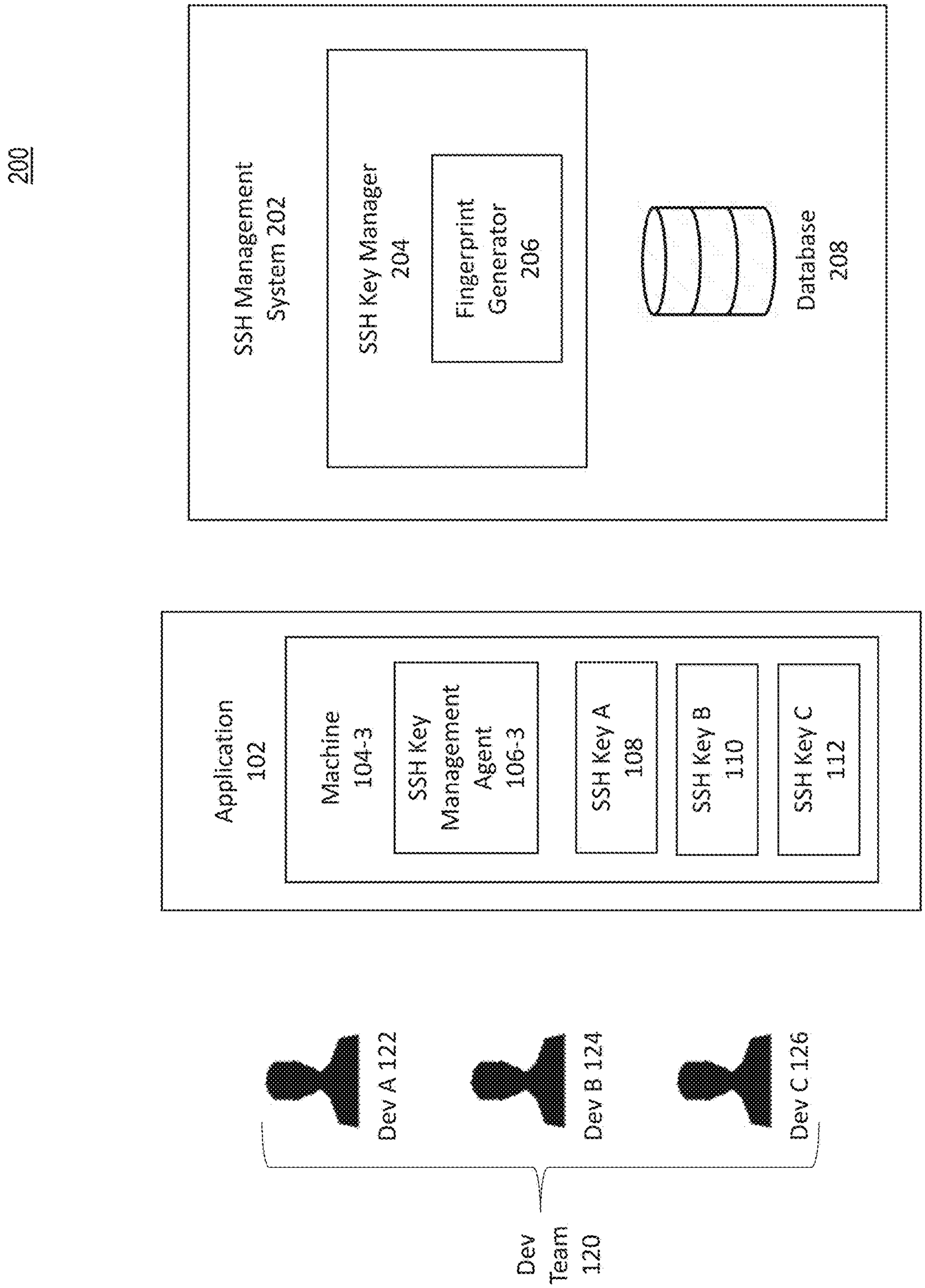
FIG. 2 illustrates a block diagram of a system for generating and managing a unique SSH key fingerprint for each installation of an SSH key, in accordance with some embodiments.

FIG. 2 illustrates a block diagram of system 200 for generating a unique SSH key fingerprint for each SSH key installed on a host machine by a particular user, according to some embodiments of the present disclosure. System 200 may comprise network 100 (of which only machine 104-3 is depicted in FIG. 2 for simplicity) and SSH management system 202. SSH management system 202 may be run on one or more computing devices and may comprise SSH key manager 204 and database 206. The one or more computing devices on which SSH management system 202 runs may be computing machines within network 100. Alternatively, SSH management system 202 may run on computing devices that are not part of network 100 but are coupled to the components of network 100 via a wired and/or wireless connection.

In some embodiments, SSH key manager 204 may be configured to manage all SSH keys used to access computing machines in network 100. Alternatively, SSH key manager 204 may be configured to manage the SSH keys used across multiple networks within the organization's computing infrastructure. In some embodiments, SSH key manager 204 may include a fingerprint generator 206. Fingerprint generator 206 may be configured to take a machine ID, user ID, and SSH key hash as inputs and output a string that comprises all three inputs. This output may be the fingerprint identifier used to identify all instances where an SSH key is used.

Additionally, or alternatively, fingerprint generator 206 may be configured to accept other values associated with an SSH key installation. This may be the case if a combination of the machine ID, user ID, and SSH key hash does not result in a unique fingerprint for the specific installation of an SSH key on a particular machine. For example, computing machine 104-3 may have multiple accounts associated with the machine, and SSH key 110 may be used by dev 124 to access all the accounts associated with machine 104-3. As a result, a combination of machine ID, user ID, and SSH key hash may not be sufficient to identify all instances of SSH key 110 in use with machine 104-3. As such, an account ID value may be included as an input to fingerprint generator 206 such that the resulting fingerprint identifier is a concatenated string comprising the account ID, machine ID, user ID, and SSH key hash.

As a non-limiting example, SSH key manager 204 may be configured to perform audits daily to determine if any of the SSH keys used in network 100 are about to expire. SSH key manager 204 may perform these audits by sending a request to database 208 for a list of all the SSH keys in use in network 100, along with the expiration date for the SSH key. SSH key manager 204 may determine, based on the response from database 208, that SSH key 108 is about to expire. In order to determine all locations within network 100 where SSH key 108 is used, SSH key manager 204 may send a subsequent request to database 208 for a list of all the unique SSH key fingerprints associated with SSH key 108.

In some embodiments, SSH key manager 204 may send a message to dev 122 indicating that SSH key 108 is about to expire. The message may further include a list of machine IDs identifying all the machines on which the SSH key is installed.

Additionally, SSH key manager 204 may also generate an audit report to be sent to a security manager for review. This audit report may include a list of SSH keys, when each SSH key will expire, the user ID associated with each key, the machines on which each key is installed, etc. The security manager may use the audit report to ensure compliance with the security policies of the organization.

Figure 3:
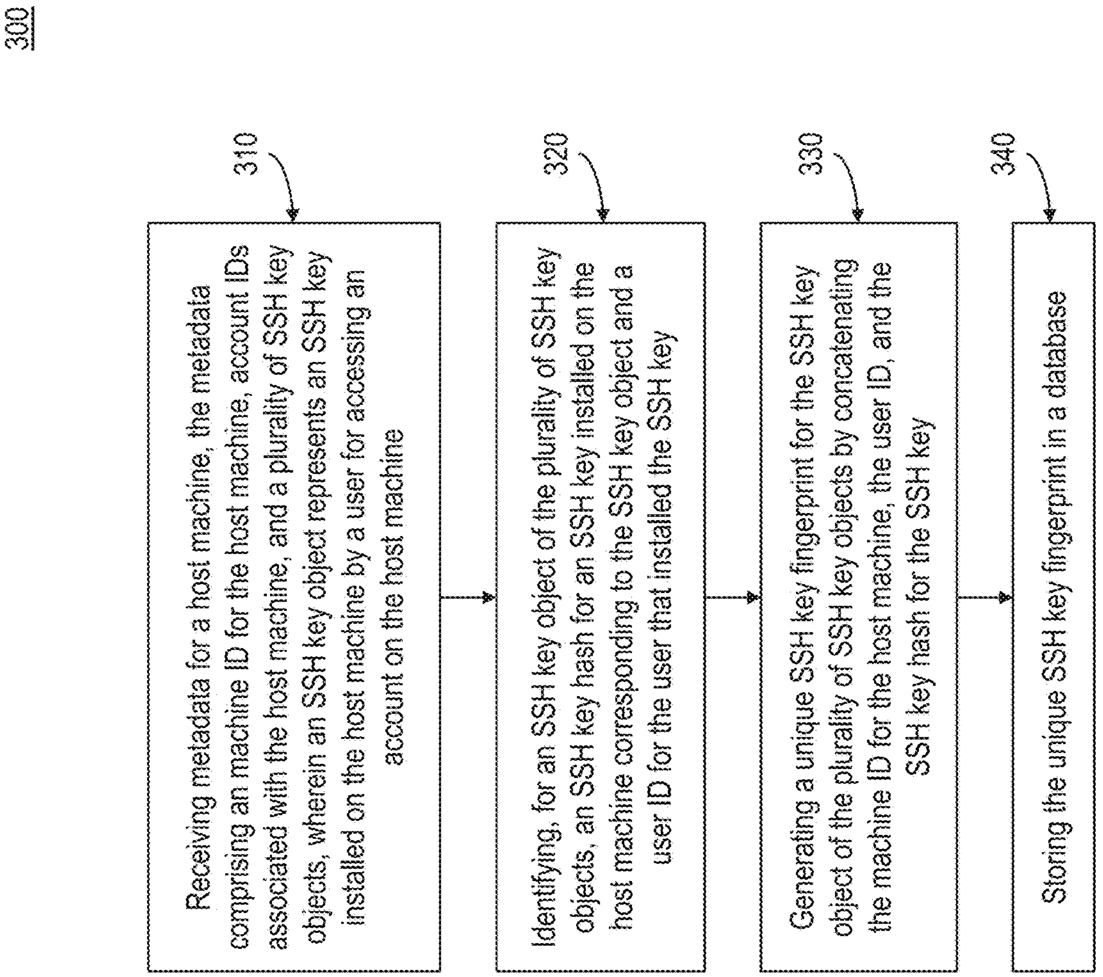
FIG. 3 illustrates a flowchart for an example method of generating a unique SSH key fingerprint for an SSH key installed on a host machine by a particular user, in accordance with some embodiments.
Figure 4:
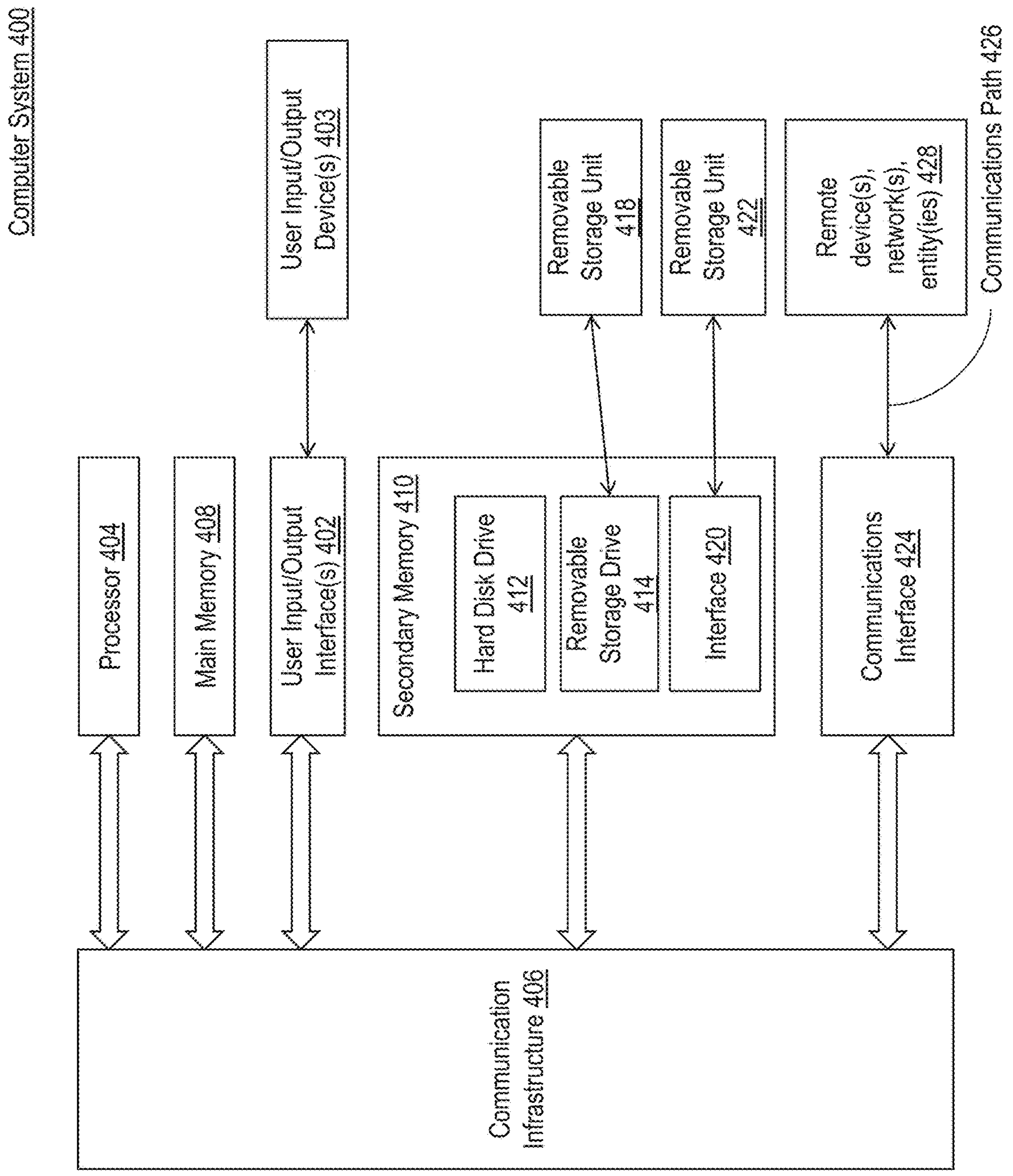
FIG. 4 illustrates an example computer system in accordance with some embodiments.

FIG. 3 illustrates a flowchart for an example method of generating a unique SSH key fingerprint for an SSH key installed on a host machine by a particular user, according to some embodiments of the present disclosure. Methods 300 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, the steps in FIG. 3 may not need to be performed in the exact order shown, as will be understood by a person of ordinary skill in the art. Accordingly, the scope of embodiments of the invention should not be considered limited to the specific arrangement of steps shown in FIG. 3.

Method 300 shall be described with reference to FIG. 2. However, method 300 is not limited to that example embodiment.

At step 310, metadata for a host machine may be received from an SSH key management agent executing on the host machine. The metadata may be sent by SSH key management agent 106-3 executing on host machine 104-3. SSH key management agent 106-3 may be a software application configured to record and report operational metadata about host machine 104-3 to SSH management system 202. Agent 106-3 may send metadata to SSH management system 202 each time an SSH key is installed on machine 104-3. Alternatively, agent 106-3 may send the metadata at predetermined time intervals (e.g., once a day).

In some embodiments, the metadata for host machine 104-3 may comprise a machine ID for the host machine 104, one or more account IDs corresponding to user accounts associated with the host machine, and a plurality of SSH key objects. Each SSH key object of the plurality of SSH key objects may represent an SSH key installed on the host machine by a particular user having a unique user ID. This user may be one of developer team 120 (dev 122, dev 124, and dev 126). Furthermore, each SSH key object may include information about its corresponding SSH key, such as the unique hash associated with the SSH key, as well as information about a user ID of the user that installed the SSH key on host machine 104-3.

At step 320, an SSH key hash and user ID corresponding to an SSH key object of the plurality of SSH key objects in the metadata may be identified. The SSH key hash may be of one of the various types of hashing algorithms such as MD5, SHA-1, SHA-2, NTLM, LANMAN, etc. As mentioned above, an SSH key object may include the unique hash associated with the SSH key corresponding to the SSH key object. As such, identification of the SSH key hash and user ID for the SSH key object may be accomplished by extracting the hash and user ID values from the SSH key object.

At step 330, a unique SSH key fingerprint may be generated for the SSH key object. The unique SSH key fingerprint is generated by, for example, concatenating the machine ID of host machine 104-3, the user ID corresponding to dev 122, and the SSH key hash of SSH key 108.

Steps 320 and 330 may be repeated for each SSH key object of the plurality of SSH key objects in the metadata for host machine 104-3 received at step 310. At step 340, the SSH key fingerprints generated at step 330 and corresponding to each SSH key object of the plurality of SSH key objects may be stored in database 208.

Various embodiments may be implemented, for example, using one or more well-known computer systems, such as a computer system 400, as shown in FIG. 6. One or more computer systems 400 may be used, for example, to implement any of the embodiments discussed herein, as well as combinations and sub-combinations thereof. The computer systems 400 may be used for the implementation of one or more embodiments described above.

The computer system 400 may include one or more processors (also called central processing units, or CPUs), such as a processor 404. The processor 404 may be connected to a communication infrastructure or bus 406.

The computer system 400 may also include user input/output device(s) 403, such as monitors, keyboards, pointing devices, etc., which may communicate with communication infrastructure 406 through user input/output interface(s) 402.

One or more processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 400 may also include a main or primary memory 408, such as random-access memory (RAM). Main memory 408 may include one or more levels of cache. Main memory 408 may have stored therein control logic (i.e., computer software) and/or data.

The computer system 400 may also include one or more secondary storage devices or memory 410. The secondary memory 410 may include, for example, a hard disk drive 412 and/or a removable storage device or drive 414. The removable storage drive 414 may be a floppy disk drive, a magnetic tape drive, a compact disk drive, an optical storage device, a tape backup device, and/or any other storage device or storage drive.

The removable storage drive 414 may interact with a removable storage unit 418. The removable storage unit 418 may include a computer-usable or readable storage device having stored thereon computer software (control logic) and/or data. The removable storage unit 418 may be a floppy disk, magnetic tape, compact disk, DVD, optical storage disk, and/or any other computer data storage device. The removable storage drive 414 may read from and/or write to the removable storage unit 418.

The secondary memory 410 may include other means, devices, components, instrumentalities, or other approaches for allowing computer programs and/or other instructions and/or data to be accessed by the computer system 400. Such means, devices, components, instrumentalities, or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 400 may further include a communication or network interface 424. The communication interface 424 may enable the computer system 400 to communicate and interact with any combination of external devices, external networks, external entities, etc. (individually and collectively referenced by reference number 428). For example, the communication interface 424 may allow the computer system 400 to communicate with the external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

The computer system 400 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples or any combination thereof.

The computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 400, the main memory 408, the secondary memory 410, and the removable storage units 418 and 422, as well as tangible articles of manufacture embodying any combination of the foregoing. Such control logic, when executed by one or more data processing devices (such as the computer system 400), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 6. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

What is claimed is:

1. A computer-implemented method, comprising:

periodically conducting, by an SSH key management system, an audit of a plurality of secure shell (SSH) keys in use within a computing network, the audit comprising determining whether one or more of the SSH keys are approaching expiration and whether any SSH key has been installed on more than one host machine;

ingesting, by the SSH key management system and based on the audit, metadata for a host machine, wherein the metadata is sent from an SSH key management agent application executing on the host machine and wherein the SSH key management agent is configured to record and report operational metadata for the host machine, the operational metadata comprising a machine ID for the host machine, one or more account IDs associated with the host machine, and a plurality of SSH key objects, wherein each SSH key object represents one of the plurality of SSH keys identified by the audit for accessing an account on the host machine associated with one of a plurality of users;

identifying, for at least one SSH key object of the plurality of SSH key objects, an SSH key hash corresponding to an SSH key installed on the host machine;

identifying a user ID corresponding to a user that generated or installed the SSH key on the host machine;

generating a unique SSH key fingerprint for the SSH key object of the plurality of SSH key objects, by combining, via concatenation, the machine ID, the user ID, and the SSH key hash for the SSH key corresponding to the SSH key object;

indexing, in a database, the unique SSH key fingerprint in association with information about the host machine, the user and the SSH key from the metadata;

executing a verification operation on one or more of the unique SSH key fingerprints stored in the database, the verification operation comprising receiving an SSH key presented for authentication to the host machine and comparing the stored SSH key fingerprint against the received SSH key, to determine whether the received SSH key corresponds to a valid SSH key; and granting access to the host machine in response to the determination that the received SSH key is valid.

2. The method of claim 1, wherein the host machine is a cloud based virtual machine and the machine ID is an instance ID.

3. The method of claim 1, wherein the SSH key management agent application is further configured to determine if an SSH key on the host machine is valid for use and, based on the determination, allow or disallow use of the SSH key for authentication of a user on the host machine.

4. The method of claim 3, wherein the determination comprises:

identifying a time period indicating an amount of time elapsed since the SSH key was created; and determining that the SSH key has not expired by comparing the identified time period for the SSH key with a predetermined expiration time, wherein the predetermined expiration time indicates a period of time for which an SSH key is valid for use.

5. The method of claim 1, wherein the unique SSH key fingerprint for the SSH key object is used to identify all installations of every SSH key in use within the computing network.

6. The method of claim 5, further comprising:

retrieving, from the database, data comprising a plurality of unique SSH key fingerprints and information about the host machine, the user, and the SSH key corresponding to each unique SSH key fingerprint of the plurality of unique SSH key fingerprints; and generating, based on the data, a security audit report for SSH keys in use within the computing network.

7. A system, comprising:

a memory; and at least one processor coupled to the memory and configured to:

periodically conduct, by an SSH key management system, an audit of a plurality of secure shell (SSH) keys in use within a computing network, the audit comprising determining whether one or more of the SSH keys are approaching expiration and whether any SSH key has been installed on more than one host machine;

ingest, by the SSH key management system and based on the audit, metadata for a host machine, wherein the metadata is sent from an SSH key management agent application executing on the host machine and wherein the SSH key management agent is configured to record and report operational metadata for the host machine, the operational metadata comprising a machine ID for the host machine, one or more account IDs associated with the host machine, and a plurality of SSH key objects, wherein each SSH key object represents one of the plurality of SSH keys identified by the audit for accessing an account on the host machine associated with one of a plurality of users;

identify, for at least one SSH key object of the plurality of SSH key objects, an SSH key hash corresponding to an SSH key installed on the host machine;

identify a user ID corresponding to a user that generated or installed the SSH key on the host machine;

generate a unique SSH key fingerprint for the SSH key object of the plurality of SSH key objects, by combining, via concatenation, the machine ID, the user ID, and the SSH key hash for the SSH key corresponding to the SSH key object;

index, in a database, the unique SSH key fingerprint in association with information about the host machine, the user, and the SSH key from the metadata;

execute a verification operation on one or more of the unique SSH key fingerprints stored in the database, the verification operation comprising receiving an SSH key presented for authentication to the host machine and comparing the stored SSH key fingerprint against the received SSH key, to determine whether the received SSH key corresponds to a valid SSH key; and granting access to the host machine in response to the determination that the received SSH key is valid.

8. The system of claim 7, wherein the host machine is a cloud based virtual machine and the machine ID is an instance ID.

9. The system of claim 7, wherein the SSH key management agent application is further configured to determine if an SSH key on the host machine is valid for use and, based on the determination, allow or disallow use of the SSH key for authentication of a user on the host machine.

10. The system of claim 9, wherein the determination comprises:

identifying a time period indicating an amount of time elapsed since the SSH key was created; and determining that the SSH key has not expired by comparing the identified time period for the SSH key with a predetermined expiration time, wherein the predetermined expiration time indicates a period of time for which an SSH key is valid for use.

11. The system of claim 7, wherein the unique SSH key fingerprint for the SSH key object is used to identify all installations of every SSH key in use within the computing network.

12. The system of claim 11, wherein the at least one processor is further configured to:

retrieve, from the database, data comprising a plurality of unique SSH key fingerprints and information about the host machine, the user, and the SSH key corresponding to each unique SSH key fingerprint of the plurality of unique SSH key fingerprints; and generate, based on the data, a security audit report for SSH keys in use within the computing network.

13. A non-transitory computer-readable device having instructions stored thereon that, when executed by at least one computing device, cause the at least one computing device to perform operations comprising:

periodically conducting, by an SSH key management system, an audit of a plurality of secure shell (SSH) keys in use within a computing network, the audit comprising determining whether one or more of the SSH keys are approaching expiration and whether any SSH key has been installed on more than one host machine;

ingesting, by the SSH key management system and based on the audit, metadata for a host machine, wherein the metadata is sent from an SSH key management agent application executing on the host machine and wherein the SSH key management agent is configured to record and report operational metadata for the host machine, the operational metadata comprising a machine ID for the host machine, one or more account IDs associated with the host machine, and a plurality of SSH key objects, wherein each SSH key object represents one of the plurality of SSH keys identified by the audit for accessing an account on the host machine associated with one of a plurality of users;

identifying, for at least one SSH key object of the plurality of SSH key objects, an SSH key hash corresponding to an SSH key installed on the host machine;

identifying a user ID corresponding to a user that generated or installed the SSH key on the host machine;

generating a unique SSH key fingerprint for the SSH key object of the plurality of SSH key objects, by combining, via concatenation, the machine ID, the user ID, and the SSH key hash for the SSH key corresponding to the SSH key object;

indexing, in a database, the unique SSH key fingerprint in association with information about the host machine, the user, and the SSH key from the metadata;

executing a verification operation on one or more of the unique SSH key fingerprints stored in the database, the verification operation comprising receiving an SSH key presented for authentication to the host machine and comparing the stored SSH key fingerprint against the received SSH key, to determine whether the received SSH key corresponds to a valid SSH key; and granting access to the host machine in response to the determination that the received SSH key is valid.

14. The non-transitory computer-readable device of claim 13, wherein the SSH key management agent application is further configured to determine if an SSH key on the host machine is valid for use and, based on the determination, allow or disallow use of the SSH key for authentication of a user on the host machine.

15. The non-transitory computer-readable device of claim 14, wherein the determination comprises:

identifying a time period indicating an amount of time elapsed since the SSH key was created; and determining that the SSH key has not expired by comparing the identified time period for the SSH key with a predetermined expiration time, wherein the predetermined expiration time indicates a period of time for which an SSH key is valid for use.

16. The non-transitory computer-readable device of claim 13, wherein the unique SSH key fingerprint for the SSH key object is used to identify all installations of every SSH key in use within the computing network.

17. The non-transitory computer-readable device of claim 16, the operations further comprising:

retrieving, from the database, data comprising a plurality of unique SSH key fingerprints and information about the host machine, the user, and the SSH key corresponding to each unique SSH key fingerprint of the plurality of unique SSH key fingerprints; and generating, based on the data, a security audit report for SSH keys in use within the computing network.

* * * * *